(No Model.)
W. E. UPJOHN.
PROCESS OF MAKING PILLS.
No. 312,041. Patented Feb. 10, 1885.
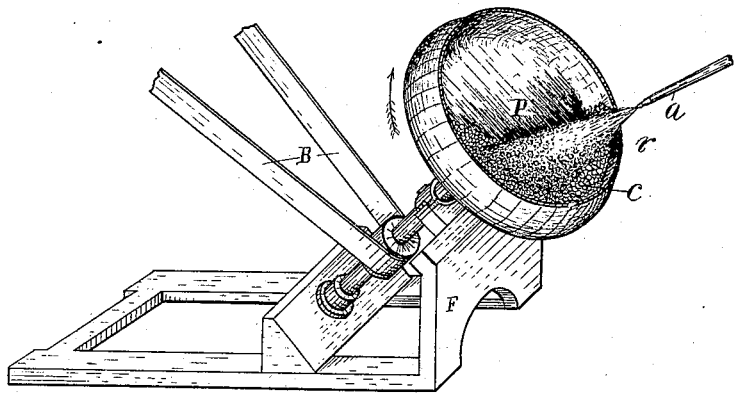
Witnesses.
John C Perkins
John H. Chase
Inventor.
William E. Upjohn
By Lucius C. West
Att'y

UNITED STATES PATENT OFFICE.

WILLIAM E. UPJOHN, OF HASTINGS, MICHIGAN.

PROCESS OF MAKING PILLS.

SPECIFICATION forming part of Letters Patent No. 312,041, dated February 10, 1885.

Application filed October 14, 1884. (No model.)

*To all whom it may concern:*

Be it known that I, WILLIAM E. UPJOHN, a citizen of the United States, residing at Hastings, county of Barry, State of Michigan, have invented a new and useful Process of Making Pills, of which the following is a specification.

This invention has for its object an improved process of making pills and confection, designed to facilitate the manufacture and improve the product, all substantially as hereinafter described and claimed.

In the drawing forming a part of this specification is shown a perspective view of devices used in the process.

Referring to the drawing, P is a pan revolubly set at an oblique angle in suitable bearings. F is a support with which the bearings are connected, and B is a power-belt broken away. Similar pans have been employed in the manufacture of pills and confection.

The particular form of the pan or by what means it is revolved is a matter of choice and convenience, the drawing being designed simply to show a revoluble pan.

At *a* the broken nozzle of any suitable device for discharging spray or vapor into the revoluble pan is shown.

I desire to include in the invention the manufacture of certain kinds of confection, which may be made in the same manner as the pills by this process.

The steps in the process are substantially as follows: I first put in the pan nuclei of any suitable material or compound to form the center of the pills, set the pan in motion, then moisten the rolling nuclei with any suitable liquid moisture applied in the form of spray or vapor, then sift onto the moistened nuclei as much of the powdered ingredient or ingredients of which the pills are to be composed by accretion to the nuclei as the damp surface of the rolling nuclei will take on, then moisten the growing pills with the spray or vapor in the manner of first moistening the nuclei, sift onto said growing pills the powdered ingredient or ingredients, and so continue the alternate moistening and powdering until the pills have grown to the desired size. The powdered ingredient may be changed as often during the growth of the pills as may be desirable in accordance with the intended medicinal character of the pills, or they may be entirely formed from a single ingredient or compound. When the pills are of a proper size, the same process of moistening and powdering may be continued to coat them, using of course for the powder powdered sugar or any suitable coating material. By this process the manufacture of pills is greatly facilitated, the product cheapened, and the medicinal efficacy increased, the pills being less compact, and hence more soluble, and capable of being easily crushed and powdered for contingent uses.

Having thus described my invention, what I claim is—

The process of making pills and confection, which consists in placing in a revoluble pan nuclei of any suitable material, setting the pan in motion, moistening the rolling nuclei with liquid spray or vapor, sifting onto the moistened nuclei powdered ingredient or ingredients, applying to the growing pills spray or vapor, sifting onto said pills the powdered ingredient or ingredients, and so on alternately moistening and powdering until the pills have grown to the desired size, all substantially as set forth.

In testimony of the foregoing I have hereunto subscribed my name in presence of two witnesses.

WILLIAM E. UPJOHN.

Witnesses:
HENRY U. UPJOHN,
JAMES ANDERSON.